May 27, 1924.  1,495,687
D. GROSCLAUDE
MANUFACTURING PROCESS FOR BOLTS WITH LOCKABLE NUTS
Filed Oct. 19, 1922
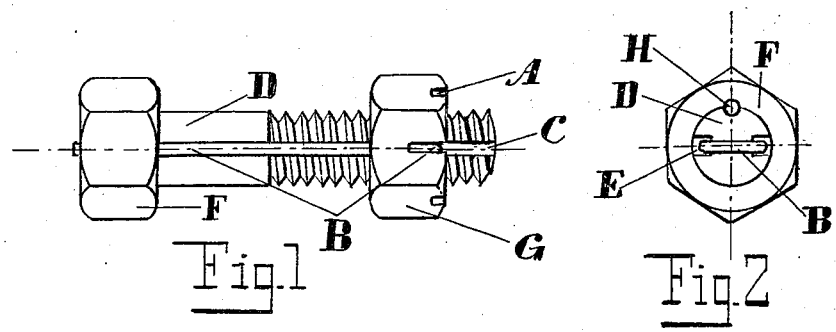
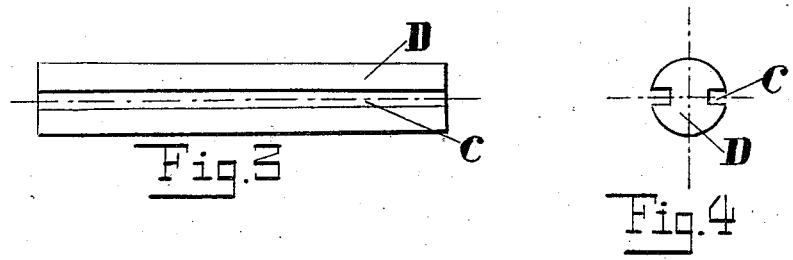
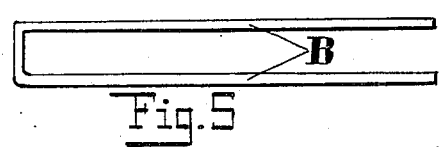
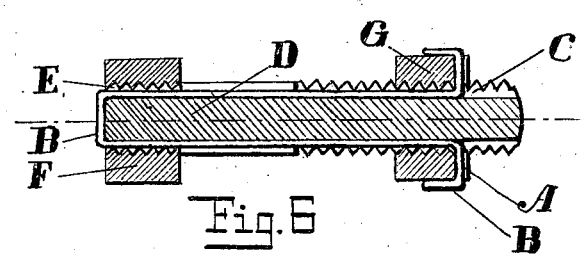
Inventor
Daniel Grosclaude
per R. S. Waters
Attorney.

Patented May 27, 1924.

1,495,687

UNITED STATES PATENT OFFICE.

DANIEL GROSCLAUDE, OF MARSEILLE, FRANCE.

MANUFACTURING PROCESS FOR BOLTS WITH LOCKABLE NUTS.

Application filed October 19, 1922. Serial No. 595,608.

*To all whom it may concern:*

Be it known that I, DANIEL GROSCLAUDE, citizen of the Republic of France, residing at No. 28 Boulevard Périer, Marseille, France, have invented certain new and useful Improvements in a Manufacturing Process for Bolts with Lockable Nuts, of which the following is a specification.

This invention relates to a manufacturing process for bolts with lockable nuts of the type used in machines subject to vibrations and in which the permanent locking of the nut on the bolt shaft is obtained by means of a bent locking rod lodged in longitudinal grooves provided on the bolt shaft.

The object of this invention is a process of manufacture realizing the easy, cheap, practical and really industrial quantity production of bolts of the type above cited.

In the accompanying drawings showing the result of the manufacturing process according to the invention in one of its forms of execution, Fig. 1 shows the finished bolt with head, shaft and nut locked together.

Fig. 2 is a front view of the bolt head.

Fig. 3 is a view of a rough bolt shaft before cutting the threads, but after milling the longitudinal side grooves.

Fig. 4 is a front view of the rough shaft shown in Fig. 3.

Fig. 5 is a view of the bent locking rod ready to be inserted in the longitudinal grooves of the bolt shaft.

Fig. 6 is a cross section of Fig. 1 taken on the plan of the bent locking rod, showing the finished bolt with head, nut and shaft locked together.

Throughout the drawings the same reference characters show corresponding parts.

Bolts and nuts of such a type are already widely known everywhere, only if it is required to use such a locking system of the nut with ordinary bolts possessing a stamped bolt head, that is to say the bolt shaft and bolt head forming a single piece, it is impossible to mill the longitudinal grooves in one operation without being obliged to drill through the bolt head the ports to allow the passing through of the bent locking rod and given the usual diameters of the circular milling and sawing tools this implies the boring of comparatively long holes through a substantial thickness of metal, with the necessity of exact adjustment. The drilling of such holes constitutes in itself a delicate operation inasmuch as the holes and the grooves must exactly meet and possess the same axis to facilitate the mounting of the bent locking rod on the bolt shaft. Very often the holes do not correspond with the milled groove ends and the locking rod has to be adjusted or the joining point of groove and hole must be adjusted by hand.

In view to avoid all these inconveniences which handicap industrially and economically this nut locking system the present invention proposes the following manufacturing process:

All the parts of the finished article are manufactured separately: the bolt head F, the bolt shaft D, the nut G and the bent locking rod B.

The bolt head F is an ordinary nut of suitable dimensions as obtainable commercially.

The bolt shaft is made with a rough bar of the desired diameter, cut to the proper length and machined, that is to say the threads are cut and the two diametrally opposed longitudinal grooves running through the whole length of the bolt shaft are milled or otherwise formed. The bolt head is fixed permanently upon the shaft in any known way such as for instance welding or, otherwise, screwed on and locked by means of a key or by means of a conical surface taking care that the face of the head is flush with the bolt shaft extremity.

In the drawing the second indicated mode is shown.

The depth of the groove C is such that the surface of the bent locking rod B, when in position, does not reach the bottom of the threading.

The nut is of the commercial type possessing on the one of its faces three diametrally disposed grooves A in which after tightening of the bolt the locking rod is bent as shown in Fig. 6.

The head end of the shaft is flush with the one plan face of the bolt head and the grooves C show upon this face as holes through which the bent locking rod B may be inserted.

With this manufacturing process no drilling of the holes E is required as the grooves are made in one working operation and a cutting of the bolt head is avoided, thus realizing economy in cost price and labor, simplicity and rapidity in mounting and absolute efficiency in service.

It is understood that the form of the bolt as a whole and in its constituting parts does not form part of the invention which is merely limited to the manufacturing process.

What I claim as my invention is:

1. A process for the manufacture of bolts for use with nuts and locking means of the character described, in which a bar is grooved longitudinally on both sides thereof, one end of the bar being then screw-threaded externally, and a head piece is fitted on to the opposite end of the bar to form a bolt having a head with holes extending therethrough for the reception of the locking means.

2. A process for the manufacture of bolts for use with nuts and locking means of the character described, in which a bar is grooved longitudinally on both sides thereof, one end of the bar being screw-threaded externally to form the bolt screw thread, and the opposite end of the bar is screw-threaded to receive a head piece which is screwed on to this end of the bar so as to encircle the ends of the longitudinal grooves and thus provide a bolt with a head having holes extending therethrough, in the manner required for the subsequent introduction of the nut-locking device.

3. A process for the manufacture of bolts for use with nuts and locking means of the character described, which consists in milling a pair of longitudinal grooves to extend from end to end of a round bar, forming an external screw-thread in one end of the grooved bar, and permanently securing an annular member on the opposite end of said bar to form a bolt head without closing the ends of the said grooves.

In testimony whereof I affix my signature in the presence of two witnesses.

DANIEL GROSCLAUDE.

Witnesses:
 EUGÈNE DUCAUSSOU,
 EUGÉNE LEFEBVRE.